Dec. 7, 1965  G. C. SMIT  3,221,997
ELECTRIC COFFEE MILL
Filed Oct. 28, 1963
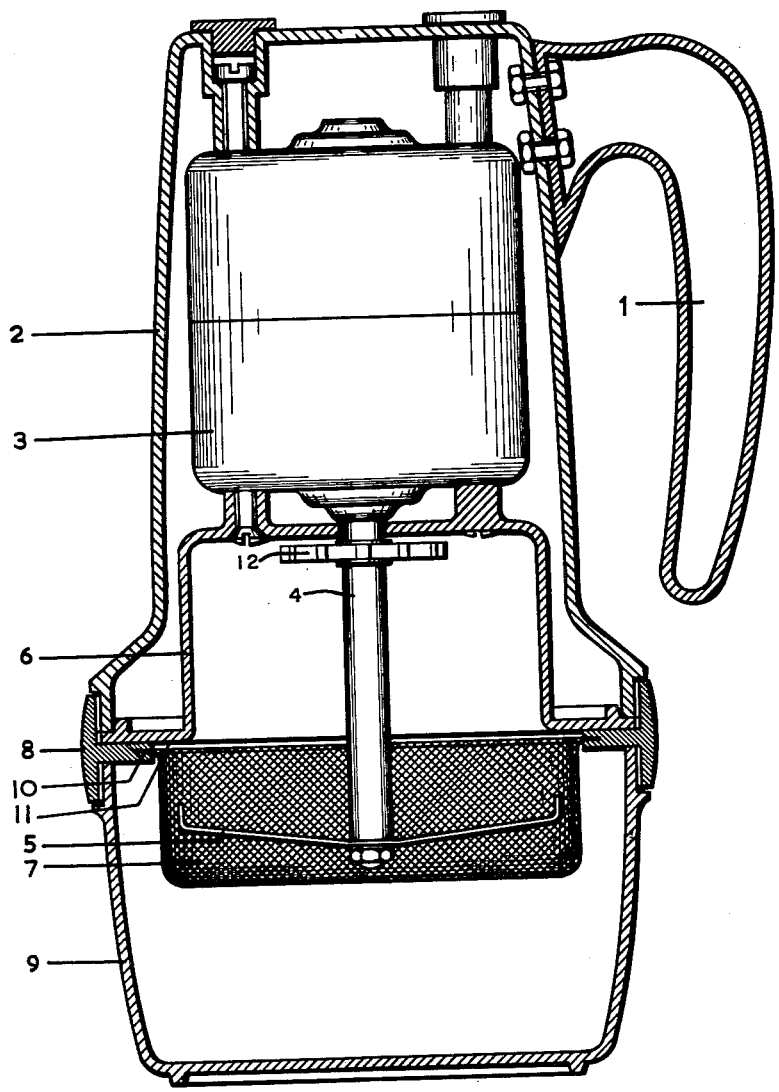
INVENTOR.
GERARD CLEMENT SMIT
BY 3,221,997
ELECTRIC COFFEE MILL
Gerard Clement Smit, Utrechtse Straatweg 26,
Amerongen, Netherlands
Filed Oct. 28, 1963, Ser. No. 319,403
2 Claims. (Cl. 241—48)

This invention relates to an electric coffee mill in which the wall of the grinding chamber, which is equipped with a cutting blade adapted to rotate at high speed, consists of a sieve admitting the passage of the coffee ground to the desired degree of fineness, which is collected in a reservoir located outwardly of the sieve wall.

A coffee-mill of this type has the disadvantage that the sieve wall surrounding the cutting blade becomes clogged after a short grinding period, so that the intended optimum particle size of the ground product is not obtained, an increase in temperature occurs which affects the quality of the coffee, and the required homogeneous composition of the ground coffee is not achieved.

It is an object of the present invention to provide an improved construction for a coffee mill of the subject type, by which to overcome the above drawbacks.

To this effect, the coffee mill according to the invention is provided with a grinding chamber, the wall of which is perforated at the bottom end only and terminates in a perforated bottom.

In addition, according to the invention, the grinding chamber may have an abrupt restriction immediately above the upper edge of the perforated wall portion.

According to the invention, the cutting blade may further be provided with ends curved away from the perforated bottom and off-set to have a scooping action in their direction of rotation.

Furthermore, according to the invention, the rotary shaft of the cutting blade may carry a radial fan adjacent the top of the grinding chamber.

One embodiment of the invention will now be described, by way of example, with reference to the accompanying drawing.

Referring to the drawing, the coffee mill comprises a housing 2 provided with a handle 1 and containing an electric motor 3, the rotary shaft 4 of which carries a cutting blade 5. The grinding chamber in which the cutting blade 5 rotates is composed of a cup 6 secured to the motor and a tray 7 perforated throughout its surface and having its rim secured to a ring 8. The ring 8 is internally threaded and is screwed on to the bottom end of the housing 2, and a reservoir 9, which surrounds the perforated tray 7 is screwed in the ring 8 by its upper rim.

Since the diameter of the cup 6 is smaller than that of the tray 7, the grinding chamber has an abrupt restriction at the upper rim of the perforated tray wall and presents a thrust face 11 to the ground material thrown up by the cutting blade 5.

In use, the coffee mill is placed in its reversed position. The ring 8 with the perforated tray 7 and the reservoir 9 are removed and the cup 6 is filled with coffee beans. Subsequently the ring 8 and its associated parts are screwed on to the housing 2 and the mill is placed with its reservoir 9 on a supporting surface. By switching in the motor 3, the grinding process is set going. During this process, the rotating blade 5, by which the beans to be ground are crushed, generates a circulating air stream, which leaves the perforated tray 7 radially through its upstanding wall into the reservoir 9 and returns into the tray 7 axially through its bottom. While the stream of air circulates through the reservoir 9, this stream has the same direction as the sufficiently reduced material entrained in it, which settles out from the circulating stream and collects on the bottom of the reservoir. As a consequence, the air stream returning into the tray 7 through the tray bottom is free of ground material to such an extent that there is no tendency for the tray bottom to become clogged by ground material entrained by the circulating stream. The power of the circulating stream of air can be increased by providing the cutting blade 5 with ends curved away from the tray bottom and offset to have a scooping action in their direction of rotation.

In addition, the material floating above the cutting may be aided to return to the active area of the cutting blade by the provision of a radial fan 12 on the shaft of the cutting blade adjacent the top of the grinding chamber.

Since the material to be ground is almost entirely kept in the immediate vicinity of the cutting blade 5 by the thrust face 11, the grinding process proceeds so rapidly that there is no danger of an increase in temperature which adversely affects the quality of the ground coffee.

After the grinding process has been completed, the reservoir 9 can be screwed off the ring 8, which remains on the housing 2, to be emptied of the ground coffee.

By providing the coffee mill with a plurality of rings 8 with sieve trays 7 of mutually different mesh grades, it will be possible to adjust the grinding process to the method of making coffee which the user may wish to apply. Irrespective of such mesh grade, the mill ensures, in addition to an unprecedentedly short grinding time, a very homogeneous product of optimum particle size.

I claim:
1. An electrically operated coffee mill comprising: an electric motor having a downwardly extending output shaft, a downwardly opening cup secured to the bottom of said motor and surrounding the upper portion of said shaft, a ring detachably mounted at the bottom end of said cup, a perforated basket carried by said ring and opening upwardly toward said cup and enclosing the lower portion of said shaft, said cup and basket forming a closed chamber in which the entire projection of said shaft is located, a receiver cup opening upwardly and connected to said ring and surrounding said perforated basket, a cutter blade mounted on the lower end of said shaft so as to rotate within said basket when the motor is energized, and said downwardly opening cup being smaller in diameter than said perforated basket and having a radially outwardly projecting flange at the bottom engaging said ring and forming an abrupt constriction in the closed chamber formed by said basket and downwardly opening cup.

2. An electrically operated coffee mill according to claim 1, which includes a frame surrounding said motor and downwardly opening cup, to which frame the motor is fixedly attached, and handle means on said frame positioned below the upper end thereof whereby the mill can be positioned with the receiver cup on the bottom or inverted so that the receiver cup is positioned on top.

References Cited by the Examiner
UNITED STATES PATENTS

| 218,627 | 8/1879 | Hasdenteufel | 241—258 |
| 1,947,385 | 2/1934 | Fitzgerald | 241—101 X |
| 2,511,357 | 6/1950 | Marty | 146—76.1 |
| 2,822,846 | 2/1958 | Ward | 241—86 X |
| 3,071,329 | 1/1963 | Shell et al. | 241—46.1 |

FOREIGN PATENTS

| 482,178 | 4/1952 | Canada. |
| 1,122,677 | 1/1962 | Germany. |
| 1,123,441 | 2/1962 | Germany. |
| 886,152 | 1/1962 | Great Britain. |

ROBERT C. RIORDON, Primary Examiner.

J. SPENCER OVERHOLSER, Examiner.